United States Patent [19]

Coenen

[11] 4,002,482

[45] Jan. 11, 1977

[54] GLASS COMPOSITIONS SUITABLE FOR INCORPORATION INTO CONCRETE

[75] Inventor: Matthias Christian Coenen, Mainz, Germany

[73] Assignee: JENAer Glaswerk Schott & Gen., Mainz, Germany

[22] Filed: Nov. 18, 1975

[21] Appl. No.: 633,078

Related U.S. Application Data

[63] Continuation-in-part of Ser. No. 549,973, Feb. 14, 1975, abandoned.

[52] U.S. Cl. .............................. 106/40 V; 106/50; 106/51; 106/52; 106/53; 106/54; 106/97; 106/98; 106/99; 106/118; 106/120; 106/314; 106/315

[51] Int. Cl.² ..................... C03C 13/00; C04B 7/02

[58] Field of Search ................. 106/50, 52, 99, 53, 106/54, 40 V, 314, 315, 98, 97

[56] References Cited

UNITED STATES PATENTS

| 1,939,329 | 12/1933 | White ................................ 106/50 |
| 3,023,116 | 2/1962 | Alford et al. ..................... 106/40 V |
| 3,202,522 | 8/1965 | Yang et al. ....................... 106/98 X |
| 3,294,558 | 12/1966 | Searight ........................... 106/47 R |
| 3,332,751 | 7/1967 | Breton ............................. 106/97 X |
| 3,365,315 | 1/1968 | Beck et al. ....................... 106/40 V |
| 3,429,724 | 2/1969 | Keenum et al. ............... 106/315 X |
| 3,736,162 | 5/1973 | Chvalovsky et al. ................ 106/99 |
| 3,804,058 | 4/1974 | Messenger ...................... 106/97 X |
| 3,864,443 | 2/1975 | Hopkins .......................... 106/98 X |
| 3,904,423 | 9/1975 | Guthrie ............................... 106/50 |

FOREIGN PATENTS OR APPLICATIONS

| 1,359,103 | 11/1962 | France ............................. 106/47 R |
| 2,129,016 | 11/1972 | Germany |
| 1,815,382 | 7/1970 | Germany |
| 981,933 | 1/1965 | United Kingdom ................. 106/50 |
| 1,200,732 | 7/1970 | United Kingdom ................. 106/99 |
| 414,267 | 8/1934 | United Kingdom ................. 106/50 |

*Primary Examiner* — Helen M. McCarthy
*Attorney, Agent, or Firm* — Stanley D. Schwartz

[57] ABSTRACT

Glasses suitable for use as long term reinforcing agents for a cementitious matrix, e.g., Portland cement, or concrete. The glasses are preferably in the form of continuous filaments, short fibers, hollow spheres, or foamed glasses and have a composition consisting essentially of:

| | Weight Percent |
|---|---|
| $SiO_2$ | 20–70 |
| $TiO_2$ | 3–12 |
| $ZnO$ | 5–70 |
| $CuO$ | 0–10 |
| $Fe_2O_3$ | 0–5 |
| $BaO$ | 0–30 |
| $CaO$ | 0–10 |
| $MgO$ | 0–15 |
| $Al_2O_3$ | 0–30 |

14 Claims, No Drawings

GLASS COMPOSITIONS SUITABLE FOR INCORPORATION INTO CONCRETE

This is a continuation-in-part of my copending U.S. patent application, Ser. No. 549,973, filed Feb. 14, 1975, now abandoned.

BACKGROUND OF THE INVENTION

The present invention relates to glass products in the form of filaments, fibers, hollow spheres, or foamed glass, and suitable for incorporation into light weight concrete. The glass products serve as reinforcements for cement, mortar, concrete or other cementitious materials.

It is well known that cement, mortar and concrete can be improved to withstand tension, impact, and abrasion by the addition of glass fibers. The use of hollow glass spheres or foamed glass as additives to light-weight concrete instead of polystyrene or other synthetic resin foams has the advantage of increased compressive strength in the absence of any water absorption by the latter materials. However, fibers or hollow spheres made of conventional glasses are not generally recommended for the long term reinforcement of concrete or cementitious products because the pH-value of cementitious products, e.g., Portland cement, attacks and substantially weakens said glass fibers and spheres whereby long term reinforcement of cementitious products is not possible.

In order to remedy this situation, the prior art has tried a number of potential solutions. One is to reduce the high pH value with atmospheric carbon dioxide (aeroconcrete) or to introduce carbon dioxide into compacted concrete. This is not satisfactory because the glasses may be utilized only in porous concrete and the process, when used with compacted concrete, is too complicated.

Secondly, it has been proposed to coat fiberglass filaments with alkali-resistant synthetic resins. This has not been satisfactory because of the difficulty of obtaining a completely dense coating on the glasses and the poor adhesion of coated fiberglass filaments to a cement matrix.

It has also been proposed to use highly alkali-resistant glass fibers of spheres. This procedure does not completely eliminate the corrosion of the glass caused by the cement but merely delays this process. Moreover, it also has the disadvantage of resulting in poor adhesion to a cementitious matrix.

Another proposal is to use fibers of alkali-free glass containing a quantity of zinc (see West German Pat. No. 2,129,016). However, this process has the disadvantage that relatively high temperatures are needed for extruding fibers of this type.

OBJECTS OF THE PRESENT INVENTION

It is therefore a significant and primary object of the present invention to provide glass reinforcing agents which do not have any of the said disadvantages of the glasses used to date. Another closely related and significant object of the present invention is the provision of a glass having a composition capable of forming reaction products with cement, said reaction products being located on the surface of the glass products, e.g., fibers whereby said reaction products protect the glasses from further corrosion while simultaneously enhancing the effectiveness of the zinc present in said compositions.

Consistent with the primary object of this invention is a glass having a composition exhibiting increased resistance to cement liquors having high pH values.

A still further object of the present invention is the provision of a glass product having a composition that exhibits good adhesion to a cement matrix thereby enabling a more complete utilization of the strength properties of the glass products when incorporated as a reinforcement agent for cementitious products.

BRIEF SUMMARY OF THE INVENTION

Glasses suitable for use in concrete and cementitious products consisting essentially of:

| Component | Percent by Weight of Composition |
| --- | --- |
| $SiO_2$ | 20–70 |
| $TiO_2$ | 3–12 |
| $ZnO$ | 5–70 |
| $CuO$ | 0–10 |
| $Fe_2O_3$ | 0–5 |
| $BaO$ | 0–30 |
| $CaO$ | 0–10 |
| $MgO$ | 0–15 |
| $Al_2O_3$ | 0–30 |

The present invention also relates to a composite produced by the reaction of at least one reinforcing material and a cementitious matrix wherein said reinforcing material is a glass composition described hereinbefore. Other conventional reinforcing agents can also be present in the reinforced concrete or cementitious matrix produced in accordance with this invention.

DETAILED DESCRIPTION OF THE INVENTION

According to the invention, glasses suitable for long term reinforcement of concrete or a cementitious matrix preferably consist essentially of oxides of zinc and those other metallic oxides which delay the curing process of cementitious materials, e.g., Portland cement, and do not decrease, but preferably increase the formation of heat from the reaction of said glass products with the cementitious matrix. However, metallic oxides having a negative effect on the delay of the curing process and the quantity of heat formed as a result of the reaction are preferably not present in the glass compositions, but if present, only in negligible amounts and generally present in an amount no greater than 0.4 mole% altogether.

In order to determine which metallic oxides are useful as components of the glasses of this invention, a selective process was employed whereby the heats of reaction were measured and compared with zinc oxide. As noted hereinbefore, zinc oxide delays the curing process of Portland cement and increases the formation of heat during the curing process. Other metallic oxides, when used either individually or as mixtures thereof, and display similar properties to zinc oxide, are also useful in the practice of this invention.

In addition to the metallic oxides present in the composition, other metallic oxides were found to have qualities similar to zinc oxide although their reactions are not as intense, i.e., not as much heat is given off during the reaction. These metallic oxides include $CuO$ and $Fe_2O_3$, and like $ZnO$, they have a "positive" effect on formation of heat during the reaction as well as a delay in curing time for the cementitious matrix.

Other metallic oxides were found to counteract the delay in curing time of the cement or concrete but still are regarded as useful in the practice of the invention. These metallic oxides include the following metallic oxides together with the relative amounts of each metallic oxide present in the composition based on the total weight of the glass composition:

| Component | Weight Percent |
|---|---|
| $SiO_2$ | 20–70 |
| $ZrO_2$ | 0–10 |
| SrO | 0–15 |
| BaO | 0–30 |
| $MnO_2$ | 0–4 |
| $NiO_2$ | 0–4 |

The group of metallic oxides found to have a "negative" effect on the delay of curing and the quantity of heat formed include $As_2O_5$, $Sb_2O_5$, $V_2O_5$, $B_2O_3$, PbO, CdO, $SnO_2$ and $M_2O$, wherein M is an alkali metal, i.e., a metal in Group 1A of the Mendeleef Periodic Table of Elements.

Certain metallic oxides including MgO, CaO and $Al_2O_3$ may have either a positive or negative effect on the delay in curing of a cement matrix as well as the quantity of heat formed during the reaction between the metallic oxides and cement, said effect depending upon the concentration of the latter metallic oxides in the glass composition. The effectiveness of the metallic oxides having a positive effect (i.e., ZnO, CuO, $TiO_2$ and $Fe_2O_3$) is eliminated when the molar sum of $Al_2O_3$ + MgO + CaO present in the glass composition is greater than 0.5 moles for each mole of the molar sum of the metallic oxides having a positive effect (ZnO + CuO + $TiO_2$ + $Fe_2O_3$) and also present therein. Thus, the molar sum of $Al_2O_3$ + CaO that can be present in the glass compositions of this invention is from 0 to 0.5 moles with respect to the molar sum of metallic oxides present and having a positive effect, i.e., ZnO + CuO + $TiO_2$ + $Fe_2O_3$.

The glasses according to the invention contain the following preferred quantities of metallic oxides which may be present either individually or as mixtures thereof: from 10–15 weight percent $Al_2O_3$ and from 8–15 weight percent MgO.

The long term glass reinforcing agents of this invention are generally prepared in accordance with conventional techniques including the extrusion of the glass composition into fibers that may be incorporated into the cement in the form of either continuous filaments or short fibers. Other glass products, including, e.g., foamed glass and hollow glass spheres or balls may also be prepared according to conventional techniques, and used, for example, in the production of light-weight concrete or cement. Foamed glasses or hollow glass spheres are prepared in accordance with techniques well known and documented in the art. See, e.g., Cooper et al, "The Foaming of Molten Silicates", *J. Iron.St. Inst.*, 193(1), 1959, pp. 48–55; Wihsmann et al., "Porous Glass", *Silikat-Technik*, 11(7), 1960, pp. 348–52; and Swisher et al, "$Cr_2O_3$ as a Foaming Agent in CaO-$SiO_2$ Slags", *Trans. Metall. Soc. A.C.M.E.*, 230(7), 1964. Hollow glass spheres can also be produced in accordance with conventional techniques.

Cementitious mixtures, e.g., Portland cement, mortar and concrete, containing the glass products having compositions in accordance with this invention, are generally incorporated therein in an amount between about 4 and 10 weight percent of the composition. It is understood that other reinforcing agents in addition to the glasses of this invention can be incorporated into the cementitious matrix.

The present invention shall be described in further detail with reference to the following examples:

EXAMPLE 1

Glass composed of 44.5 $SiO_2$, 51.0 ZnO, 4.5 CuO (expressed in % by weight) with an additive of 1% of $BaSO_4$ as a refining agent, was melted in an earthenware crucible in a gas furnace. Thereafter, part of the mixture was processed into fibers of 30 μm diameter by upward extrusion from the melting pot. The remaining glass was poured out, quenched and ground into grains with a mean granular size of 10 to 40 μm. The grains were mixed with Portland cement P 375 at a ratio of 0.3 : 1. An appropriate quantity of water was added to yield a paste having water value of 0.35. The paste was filled into a beaker. Its internal temperature was measured with a thermo-element and was recorded as a function of time. A delay and an increased formation of heat was found in a comparison with pure cement.

The fibers differed from customary glass fibers in possessing presumably a very low mutual dry fraction due to the presence of copper. The fibers were placed into concentrated cement grout in a polyethylene flask. From time to time, fibers were removed and tested for their strength. The strength decreased by about 20% of its initial value, during the first two days, but then remained constant for months, as compared with the strength of virgin fibers.

EXAMPLE 2

Glass composed of 57 $SiO_2$, 24.2 $Al_2O_3$, 9.4 ZnO and 9.4 CuO (expressed in percent by weight) was melted in a crucible in a gas furnace and then was treated as described in Example 1 above. This glass was more resistant to crystallization than the glass described under Example 1, and it had a higher modulus of elasticity. Its delaying effect was lower. Its strength in cement liquor remained constant over a period of 120 days after a loss of about 30% had occurred when compared to the strength of virgin fibers.

EXAMPLE 3

Glass composed of 38 $SiO_2$, 8 $TiO_2$, 6 MgO, 8 CaO, 18 BaO, 21 ZnO, 2 CuO (expressed by percent by weight) was melted in a platinum crucible in an induction furnace and was treated as described in Example 1 above. Its resistance to crystallization was found to be good. The temperature necessary for extrusion was lower than comparable figures for the glasses in Examples 1 and 2. Its modulus of elasticity was found to be lower than the equivalent value in Example 2. The delay in the curing process and increased heat formation were better than in Example 2. Its resistance to cement liquor dropped 30%, compared to the strength of virgin fibers, and then remained constant over a long period of time.

EXAMPLE 4

Glass composed of 40 $SiO_2$, 7 $TiO_2$, 14 $Al_2O_3$, 8 CaO, 7 BaO, 22 ZnO, 2 CuO (expressed in percent by weight) was melted in a platinum crucible in an induction furnace and treated as described in Example 1 above. Its resistance to crystallization was found to be good as in Example 3. Its extrusion temperature was slightly higher than is quoted in 3. Its modulus of elasticity corresponded to the figure obtained in Example 2. The delay in curing and increased heat formation corresponded to the findings in Example 3. Its strength in cement liquor dropped by 30%, compared to the strength of virgin fibers, and then remained constant.

It is understood that other changes may be made with respect to the compositions without departing from the spirit of the invention, especially as defined in the following claims. ACCORDINGLY,

What is claimed is:

1. Glasses suitable for use as a long term reinforcing agent in concrete or in other cementitious matrix and having a composition consisting essentially of:

|  | Weight Percent |
| --- | --- |
| $SiO_2$ | 20–70 |
| $TiO_2$ | 3–12 |
| ZnO | 5–70 |
| CuO | 0–10 |
| $Fe_2O_3$ | 0–5 |
| BaO | 0–30 |
| CaO | 0–10 |
| MgO | 0–15 |
| $Al_2O_3$ | 0–30 | wherein the ratio of the molar sum of $Al_2O_3$ + MgO + CaO to the molar sum of ZnO + CuO + $TiO_2$ + $Fe_2O_3$ present in the composition is equal to or less than 0.5, in which metallic oxides selected from the group consisting of $As_2O_3$, $Sb_2O_3$, $V_2O_5$, $B_2O_3$, PbO, CdO, $SnO_2$ and $M_2O$ wherein M is an alkali metal, if present, amount to not greater than 0.4 mole % altogether, and whereby said composition delays the curing of said concrete or cementitious matrix and increases the formation of heat when said composition reacts with said concrete or cementitious matrix.

2. Glasses according to claim 1, wherein said composition contains from 10 – 15 weight percent $Al_2O_3$.

3. Glasses according to claim 1, wherein said composition contains from 8 – 15 weight percent MgO.

4. Glasses according to claim 2, wherein said composition contains from 8 – 15 weight percent MgO.

5. Glasses according to claim 1, wherein said composition contains from 0 – 10 weight percent CuO.

6. Glasses according to claim 4, wherein said composition contains from 0 – 10 weight percent CuO.

7. Glasses according to claim 1, wherein said glass is extruded into fibers.

8. Glasses according to claim 1, wherein said glasses are hollow spheres or foamed glasses.

9. A cementitious product comprising (1) a cementitious matrix, having incorporated therein (2) at least one reinforcing material having a composition according to claim 1, and (3) the reaction product of (1) and (2) located on the surface of the glass reinforcing material.

10. The cementitious product of claim 9, wherein said cementitious matrix is Portland cement.

11. The cementitous product of claim 9, wherein said cementitious matrix is concrete.

12. The cementitious product of claim 9 wherein said reinforcing material is in the form of hollow spheres or foamed glasses.

13. The cementitious product of claim 12, wherein said cementitious matrix is Portland cement.

14. The cementitious product of claim 12, wherein said cementitious matrix is concrete.

* * * * *